US009073389B2

(12) United States Patent
Buxton et al.

(10) Patent No.: US 9,073,389 B2
(45) Date of Patent: Jul. 7, 2015

(54) ALL STEEL FABRIC RADIAL CONSTRUCTION FOR AGRICULTURAL TIRES

(75) Inventors: Todd A. Buxton, Norton, OH (US); Bradley J. Harris, New London, OH (US); Christopher A. Swartzwelder, Akron, OH (US); Nobuo Shimizu, Cuyahoga Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 228 days.

(21) Appl. No.: 13/278,938

(22) Filed: Oct. 21, 2011

(65) Prior Publication Data
US 2013/0098518 A1 Apr. 25, 2013

(51) Int. Cl.
| | |
|---|---|
| B60C 9/18 | (2006.01) |
| B60C 11/00 | (2006.01) |
| B60C 11/11 | (2006.01) |
| B60C 15/00 | (2006.01) |
| B60C 15/06 | (2006.01) |
| B60C 11/03 | (2006.01) |
| B60C 9/20 | (2006.01) |
| B60C 13/00 | (2006.01) |

(Continued)

(52) U.S. Cl.
CPC .............. B60C 9/185 (2013.01); B60C 11/0311 (2013.04); B60C 9/2006 (2013.04); B60C 13/002 (2013.04); B60C 2200/08 (2013.04); B60C 9/08 (2013.01); B60C 9/14 (2013.01); B60C 2013/045 (2013.04); B60C 2009/145 (2013.04); B60C 11/033 (2013.04)

(58) Field of Classification Search
CPC ........ B60C 9/18; B60C 9/1835; B60C 9/185; B60C 15/06; B60C 2200/08
See application file for complete search history.

(56) References Cited

U.S. PATENT DOCUMENTS

| | | | |
|---|---|---|---|
| 4,184,529 A | 1/1980 | Boileau | |
| 4,989,658 A | 2/1991 | Maathuis et al. | |

(Continued)

FOREIGN PATENT DOCUMENTS

| | | | |
|---|---|---|---|
| EP | 301093 | * | 2/1989 |
| EP | 0604807 | | 7/1994 |

(Continued)

OTHER PUBLICATIONS

Joong Sub Han; International Search Report and Written Opinion; Feb. 27, 2013; pp. 1-10; Korean Intellectual Property Office; Daejeon, Republic of Korea.

(Continued)

Primary Examiner — Justin Fischer (57) ABSTRACT

A pneumatic tire for agricultural equipment or forestry equipment includes a circumferential tread, a pair of sidewalls, and a pair of bead portions. A steel reinforced radial carcass ply extends circumferentially about the tire. The carcass ply includes an axially inner portion and axially outer turn-up portions. First and second steel reinforced belts are disposed between the carcass ply and the circumferential tread. Axial ends of the belts are separated by belt wedges. The tire includes a pair of sidewall inserts. Each sidewall insert extends continuously from an upper end extending between the first belt and the carcass ply, through a sidewall region of the tire, to a lower end extending between the inner portion of the carcass ply and one of the turn-up portions of the carcass ply. A tie gum layer binds an inner liner to the carcass ply.

20 Claims, 5 Drawing Sheets (51) Int. Cl.
*B60C 9/08* (2006.01)
*B60C 9/14* (2006.01)

(56) References Cited

U.S. PATENT DOCUMENTS

| | | |
|---|---|---|
| 5,007,974 A | 4/1991 | Maathuis et al. |
| H1333 H | 7/1994 | Helfer et al. |
| 5,337,814 A * | 8/1994 | Bonko ............... 152/209.12 |
| 5,490,551 A | 2/1996 | Prakash et al. |
| 5,622,576 A | 4/1997 | Lobb et al. |
| 5,824,169 A | 10/1998 | Landers et al. |
| 5,858,137 A | 1/1999 | Assaad et al. |
| 6,145,560 A * | 11/2000 | Yamada et al. .............. 152/532 |
| 6,386,652 B1 | 5/2002 | Bonko |
| 6,422,280 B1 | 7/2002 | Thomas |
| 6,499,522 B1 | 12/2002 | Cluzel |
| 6,634,398 B1 | 10/2003 | Malin et al. |
| 6,736,174 B2 | 5/2004 | Inoue et al. |
| 6,739,186 B1 * | 5/2004 | Schartz et al. ................. 73/146 |
| 7,082,978 B2 | 8/2006 | Sinopoli et al. |
| 7,762,296 B2 | 7/2010 | Ganz et al. |
| 7,775,247 B2 | 8/2010 | Sinopoli et al. |
| 7,836,929 B2 | 11/2010 | Jin et al. |
| 2004/0020578 A1 | 2/2004 | Sinopoli et al. |
| 2005/0133140 A1 | 6/2005 | Lee et al. |
| 2006/0124217 A1 | 6/2006 | Frank et al. |
| 2006/0237110 A1 | 10/2006 | Barguet et al. |
| 2007/0175566 A1 | 8/2007 | Frank et al. |
| 2009/0183820 A1 * | 7/2009 | Sawada ........................ 156/123 |
| 2009/0283193 A1 | 11/2009 | Hayashi |
| 2010/0051161 A1 | 3/2010 | Taylor |
| 2010/0288412 A1 | 11/2010 | Barguet et al. |
| 2011/0056606 A1 | 3/2011 | Maus |
| 2011/0265923 A1 * | 11/2011 | Arnold et al. ................. 152/151 |
| 2012/0216935 A1 * | 8/2012 | Nakata et al. ................. 152/526 |

FOREIGN PATENT DOCUMENTS

| | | |
|---|---|---|
| EP | 0937587 A2 | 8/1999 |
| EP | 0937588 A2 | 8/1999 |
| EP | 2181862 A1 | 5/2010 |
| JP | 6156011 A | 6/1994 |
| JP | 8142602 A | 6/1996 |
| JP | 11011107 A | 1/1999 |
| JP | 2000-079806 | 3/2000 |
| JP | 2012-153235 A | 8/2012 |
| WO | 9808697 A1 | 3/1998 |
| WO | 2005071157 A1 | 8/2005 |
| WO | WO 2007/138918 * | 12/2007 |
| WO | WO 2011036893 * | 3/2011 |

OTHER PUBLICATIONS

Supplementary Partial European Search Report in corresponding European Patent Application No. EP 12 84 2675, dated Apr. 9, 2015, 7 pp.

* cited by examiner

ALL STEEL FABRIC RADIAL CONSTRUCTION FOR AGRICULTURAL TIRES

FIELD OF THE INVENTION

The present invention relates to pneumatic tires, and more particularly to a tire for use on agricultural equipment or forestry equipment.

BACKGROUND OF THE INVENTION

The traditional construction of agricultural tires includes a nylon carcass or body ply with polyester belts. In some cases steel belts have also been used in place of polyester belts. However, steel has generally not been utilized as a carcass or body ply material for agricultural tires.

As market demands have required agricultural tires operating at increased pressures, those demands have been met by adding more nylon carcass or body plies and more polyester belts, resulting in tire constructions of increased complexity, weight and cost.

SUMMARY

In one embodiment a pneumatic agricultural or forestry tire comprises a circumferential tread, a pair of sidewalls, and a pair of bead portions. The tread portion includes first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than about 40%. Each bead portion includes a bead core and a bead filler. The tire also includes one and only one steel reinforced carcass ply extending circumferentially about the tire. The carcass ply includes an axially inner portion and axially outer turn-up portions that extend around the bead portions and extend upwardly towards the tread and terminate at turn-up ends. The tire further includes two and only two circumferentially extending steel reinforced belts disposed between the steel reinforced carcass ply and the circumferential tread. Each belt has a pair of axial ends. The two belts include a first belt is located radially inward of a second belt.

In another embodiment a pneumatic radial agricultural or forestry tire includes a tread portion, and a pair of opposing bead portions. The tread portion includes first and second rows of tread lugs extending from first and second shoulders of the tread portion toward an equatorial plane of the tire. The lugs extend at an angle of from 0° to 65° to a rotational axis of the tire. The tread portion has a ratio of contact area to total tread area of no greater than 40%. Each bead portion has a bead core and a bead filler. The tire includes a carcass reinforcing ply. The carcass reinforcing ply has radially oriented steel cords. The carcass reinforcing ply has an axially inner portion and two turn-up portions. One turn-up portion extends from each end of the axially inner portion and has a terminal end. The main portion of the carcass reinforcing ply extends between the opposing bead portions and the turn-up portions are located axially outward of the bead portions. The tire includes a first radially inner belt and a second radially outer belt, each belt having steel cords. The belts are disposed between the carcass reinforcing ply and the tread portion. The tire includes a pair of sidewall inserts. Each sidewall insert extends continuously from an upper end extending between the first belt and the carcass ply, through a sidewall region of the tire, to a lower end extending between the inner portion of the carcass reinforcing ply and one of the turn-up portions of the carcass reinforcing ply. The lower end of each sidewall insert overlaps an associated bead filler. A pair of belt wedges extend circumferentially about the tire. Each belt wedge extends between axial ends of the belts and has a maximum thickness in a range of from 0.2 inch to 0.6 inch. A tie gum layer is located radially and axially inward of the carcass reinforcing ply. An inner liner is located radially and axially inward of the tie gum layer.

DETAILED DESCRIPTION OF THE INVENTION

Following are definitions of selected terms employed herein. The definitions include various examples and/or forms of components that fall within the scope of a term and that may be used for implementation. The examples are not intended to be limiting. Both singular and plural forms of terms may be within the definitions.

"Aspect ratio" means the ratio of the tire's section height to its section width.

"Axial" and "axially" refer to directions which are parallel to the axis of rotation of a tire.

"Bead" or "bead core" refers to that part of a tire comprising an annular tensile member, the bead core, wrapped by ply cords and shaped, with or without other reinforcement elements to fit a designed tire rim.

"Belt ply" refers to an annular layer or ply of parallel cords, woven or unwoven, underlying the tread, not anchored to the bead.

"Carcass" refers to the tire structure apart from the belt structure, tread, undertread, and sidewall rubber but including the beads, (carcass plies are wrapped around the beads).

"Circumferential" refers to lines or directions extending along the perimeter of the surface of the annular tread perpendicular to the axial direction.

"Cord" means one of the reinforcement strands of which the plies in the tire are comprised.

"Crown" refers to substantially the outer circumference of a tire where the tread is disposed.

"Equatorial plane (EP)" refers to a plane that is perpendicular to the axis of rotation of a tire and passes through the center of the tire's tread.

"Inner liner" means the layer or layers of elastomer or other material that form the inside surface of a tubeless tire and that contain the inflating fluid within the tire.

"Nominal rim diameter" means the average diameter of the rim flange at the location where the bead portion of the tire seats.

"Ply" means a continuous layer of rubber coated parallel cords.

"Radial" and "radially" refer to directions that are perpendicular to the axis of rotation of a tire.

"Radial-ply" or "radial-ply tire" refers to a belted or circumferentially-restricted pneumatic tire in which the ply cords which extend from bead to bead are laid at cord angles between 65 degree and 90 degree with respect to the equatorial plane of the tire.

"Section height" (SH) means the radial distance from the base of the bead core to the outer diameter of the tire at its equatorial plane.

"Section width" (SW) means the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands.

"Steel" includes steel alloys.

"Turn-up height" (TH) means the radial distance from the base of the bead core to the upper end of the turn-up.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Figure 1:
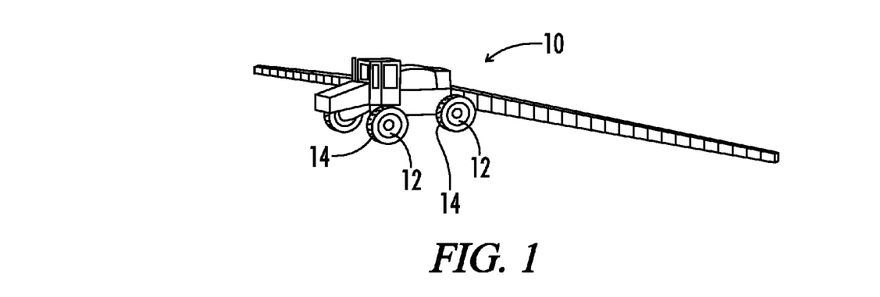
FIG. 1 is a schematic view of an agricultural machine, in this case a self-propelled sprayer, utilizing the tires of the present invention.

In FIG. 1 an agricultural machine 10 includes a plurality of wheels 12 each of which carries a pneumatic tire 14. The agricultural machine illustrated in FIG. 1 is a self-propelled sprayer. The tires thus described herein are suitable for use on agricultural equipment including self-propelled sprayers, tractors and combines and on forestry equipment, and other similar applications.

Figure 2:
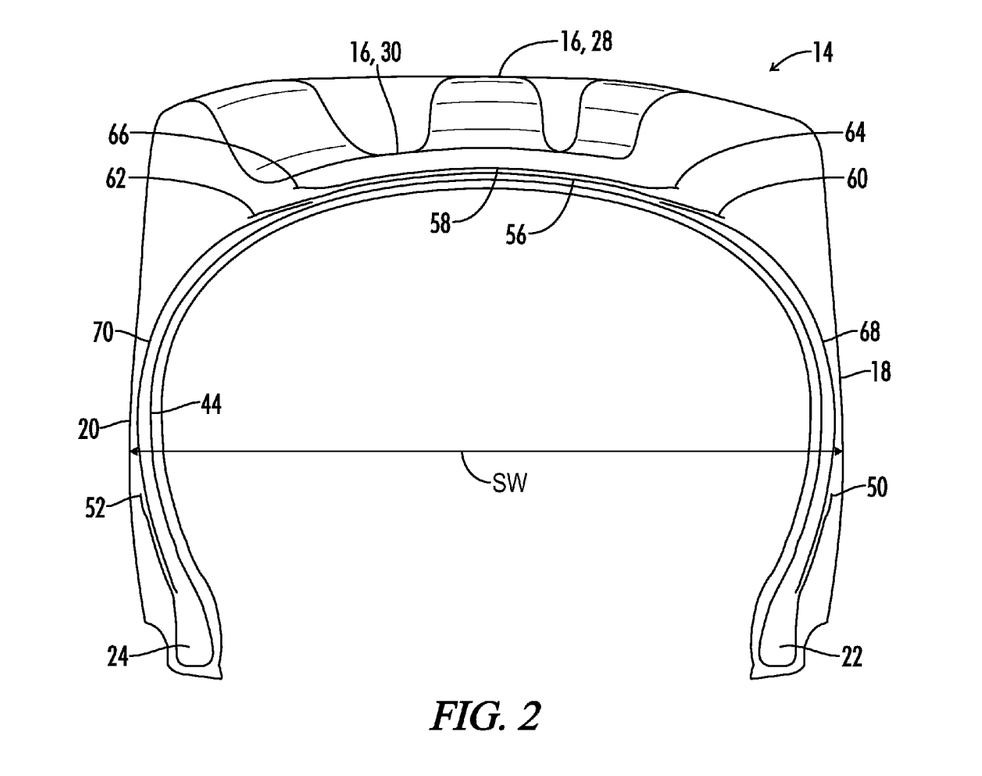
FIG. 2 is a schematic cross-section view of the tire of the present invention.
Figure 4:
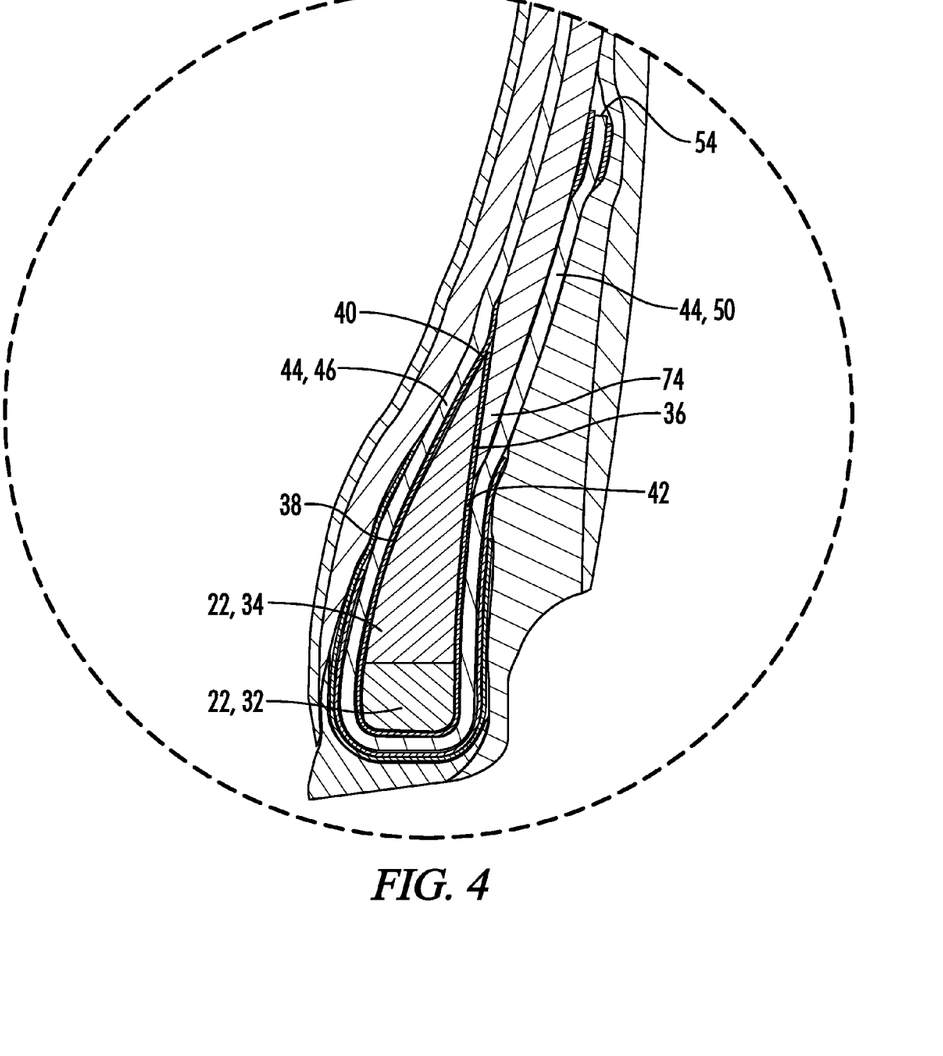
FIG. 4 is an enlarged view of the lower sidewall portion of the tire of FIG. 3.
Figure 5:
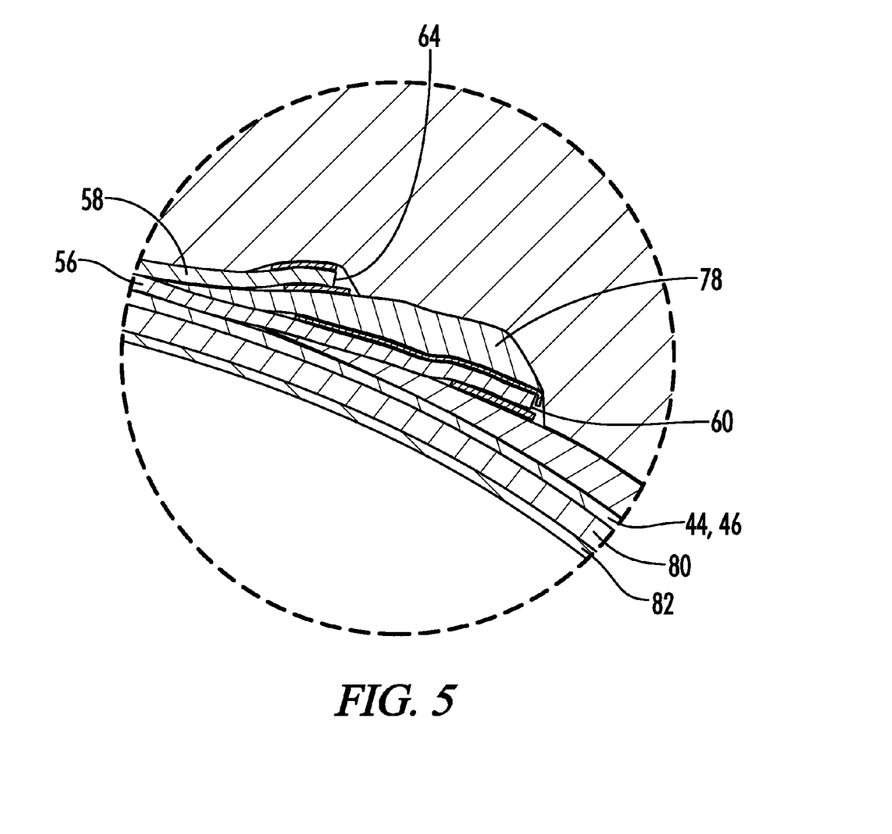
FIG. 5 is an enlarged view of the belt ends and belt wedge area of the tire of FIG. 3.
Figure 6:
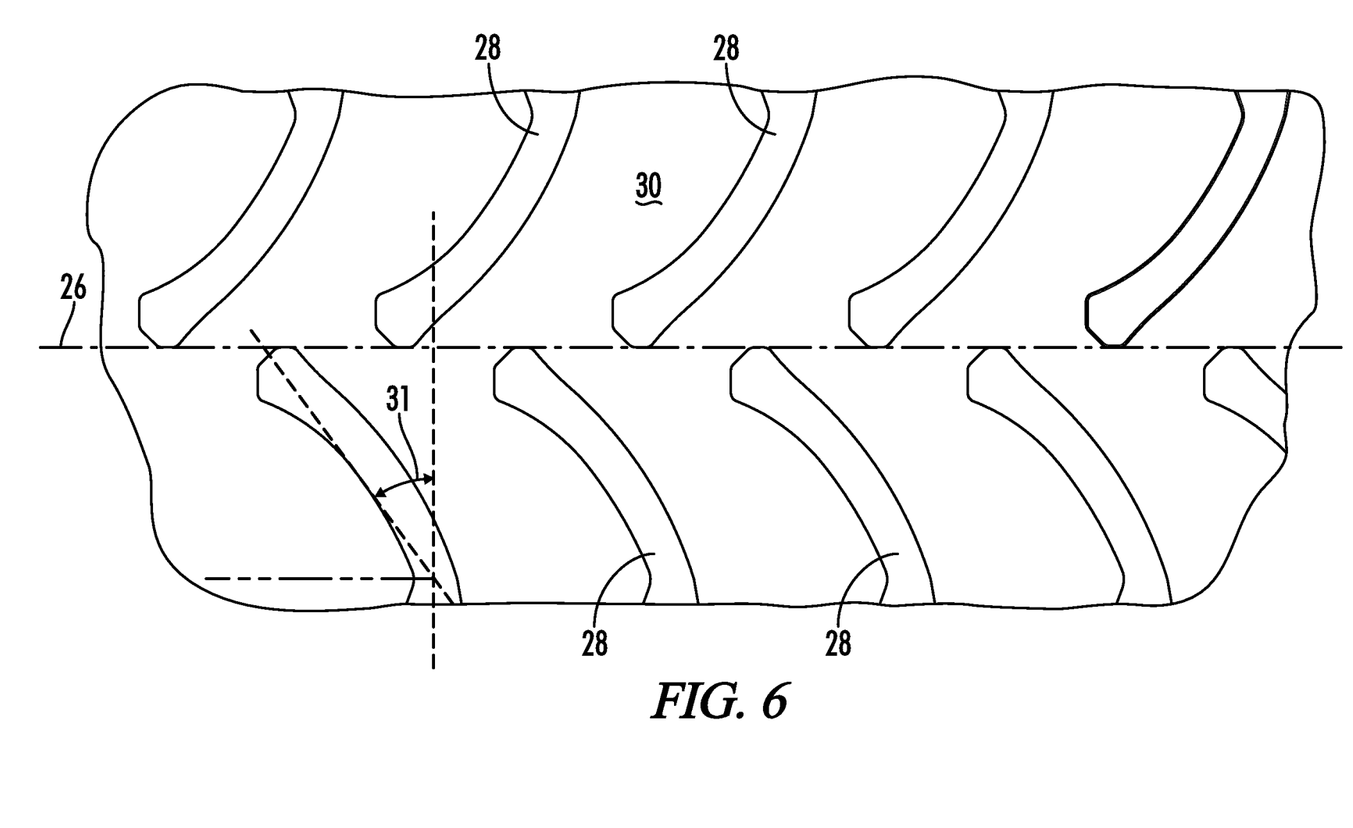
FIG. 6 is a laid out view of the lugs of the tread portion.

In FIG. 2 a cross-sectional view is shown of one of the tires 14. In FIG. 2 the various plies and belts are shown schematically only and their locations are shown by single lines. The details of those features are shown in the enlarged views of FIGS. 3, 4 and 5. The tire 14 includes a circumferential tread or tread portion 16, first and second sidewalls or sidewall portions 18 and 20, and first and second beads or bead portions 22 and 24. The tread portion 16 includes a plurality of lugs 28 extending upward from a tread floor 30. As seen in FIG. 6, the tread includes first and second rows of lugs extending from first and second shoulders of the tread portion to or near the equatorial plane 26. The lugs extend at an angle 31 to the rotational axis of the tire. In the example shown the lugs 28 are slightly curved and angle 31 as measured from the centerline of the root of the lug to the centerline of the free end of the lug is about 37°. More generally, the angle 31 may be in a range of from 0° to 65°. The tread portion has a ratio of contact area of the lugs to total tread area of no greater than about 40%.

The agricultural and forestry tires utilizing the present design are also relatively large tires which may have outside diameters in a range of from about 40 to about 92 inches. The design is especially useful on the very large tires having outside diameters of greater than about 55 inches.

Figure 3:
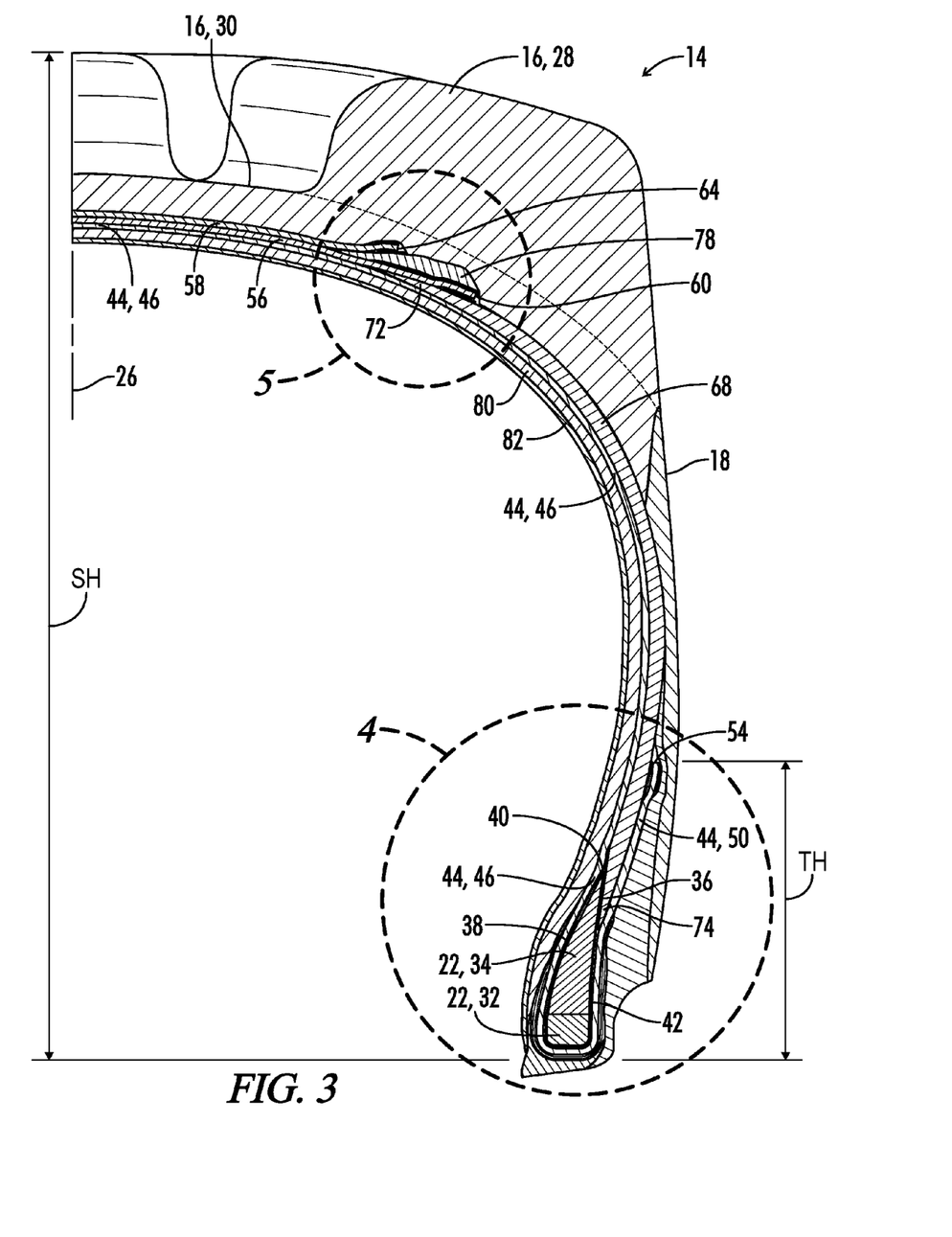
FIG. 3 is an enlarged cross-sectional view of one embodiment of one half of the tire of FIG. 2 with the drawing being split along the equatorial plane of the tire.

Referring now to FIG. 3 an enlarged half sectional view of the tire 14 is shown wherein the drawing is split about the equatorial plane 26 of the tire. It will be understood that with regard to the internal features of the tire the half of the tire cross-section not shown is substantially a mirror image about the equatorial plane 26. The tread pattern may vary on either side of the equatorial plane.

The tire has a section width, SW, shown in FIG. 2, a section height, SH, shown in FIG. 3, and a turn-up height, TH, shown in FIG. 3.

As seen in FIG. 3, each of the bead portions such as bead portion 22 includes a bead core 32 and a bead filler 34. The bead core 32 comprises a bundle of bead wires. The bead filler 34 has upper walls 36 and 38 that converge to an apex or upper end 40 at a radially outer portion thereof.

The bead portion 22 may be wrapped with a thin fabric layer sometimes referred to as a flipper 42.

A steel reinforced carcass ply 44, sometimes also referred to as a body ply 44, extends circumferentially about the tire, and extends from one bead portion 22 to the other bead portion 24. The carcass ply 44 is a radial ply. The carcass ply 44 includes an axially inner portion 46 which extends between the bead portions 22 and 24, and includes first and second axially outer turn-up portions 50 and 52 that extend under and around the bead cores such as 32 and extend upwardly towards the tread 16 and terminate at a turn-up end such as 54.

In the embodiment illustrated there is one and only one carcass ply. For agricultural and forestry tires as disclosed herein the one and only one steel reinforced carcass ply is sufficient to provide the necessary tire strength while avoiding the increased weight of multiple carcass plies.

First and second circumferentially extending steel reinforced belts 56 and 58 are disposed between the carcass ply 44 and the circumferential tread portion 16. The first belt 56 is located radially inward of the second belt 58. First belt 56 has axial ends 60 and 62. Second belt 58 has axial ends 64 and 66. Preferably there are two and only two such belts. For agricultural and forestry tires as disclosed herein, two steel reinforced belts are sufficient to provide the necessary tire strength while avoiding the increased weight of additional belts. Also when only two belts are used, relatively thick belt wedges may be used to keep the belt edges separated under the high localized stresses caused by the large tread lugs of agricultural and forestry tires.

The tire 14 includes first and second sidewall inserts 68 and 70. Each sidewall insert, such as the sidewall insert 68 seen in FIG. 3, extends continuously from an upper end 72 to a lower end 74. The upper end 72 is tapered and extends between the first belt 56 and the carcass ply 44. The lower end 74 is tapered and extends between the inner portion 46 of carcass ply 44 and the turn-up portion 50 of carcass ply 44, and also the lower end 74 overlaps with the bead filler 34.

The sidewall insert 68 serves a number of functions. Throughout the sidewall region of the tire it serves as a cushion to protect the carcass ply 44 from impacts by foreign articles against the sidewall of the tire. Its upper portion near the upper end 72 extends between the first belt 56 and the carcass ply 44 and protects the carcass ply 44 from the edge 60 of the first belt 56. Its lower portion separates the axially inner portion 46 of the carcass ply from the turn-up portion 50. The continuous one-piece nature of the sidewall insert from its upper end to its lower end aids in the efficiency of assembly and construction of the tire.

Each of the turn-up portions such as turn-up portion 50 has a turn-up height TH extending above the bead filler 34. This relatively higher than normal turn-up height TH improves the lower sidewall durability of the tire which is important in agricultural tires because they are likely to run over obstacles in a field which can damage sidewalls.

Each of the sidewall inserts such as 68 is of a one piece construction all of the same elastomeric compound, typically a gum strip. The sidewall inserts are made of material similar to the sidewall and effectively become part of the sidewall. Suitable materials for the sidewall insert 68 may be low sulfur materials to avoid corrosion of the steel carcass ply.

The tire 14 further includes a pair of belt wedges such as 78 extending circumferentially about the tire. Each belt wedge 78 extends between the axial edges or ends such as 60 and 64 of the first and second belts 56 and 58. The belt wedges are preferably relatively thick belt wedges having a maximum thickness in the range of from about 0.2 inch to about 0.6 inch, and more preferably in the range of from about 0.3 inch to about 0.5 inch, and most preferably the belt wedges have a maximum thickness of about 0.4 inch, all in a green uncured condition. It will be understood that these green uncured thicknesses change during molding and curing of the tire, and so the stated thicknesses are not necessarily present in the finished tire. Such a thick belt wedge aids in transferring the high point forces from the lugs of an agricultural tire to the carcass of the tire. The thick belt wedges also aid in maintaining separation of the belt edges during the molding of the large lugs of the tread.

It will be understood that agricultural tires and forestry tires have large deep lugs which in combination with the large open spaces in the tread pattern between lugs results in relatively large load concentrations directly below the lugs as contrasted to automotive tires, truck and bus tires, or construction equipment tires. Such agricultural tire tread types are specified in the industry as R-1, R-1W and R-2 tread codes as defined by the Tire and Rim Association.

The tire 14 includes a tie gum layer 80 located radially and axially inward of the carcass ply 44. An inner liner 82 is located radially and axially inward of the tie gum layer 80. The tie gum layer 80 is a relatively thick tie gum layer and may have a thickness of from about 0.1 inch to about 0.25 inch, and more preferably about 0.16 inch in a green uncured condition. The thickness of the tie gum layer of course changes during the molding and curing of the tire. For example, using a tie gum layer having a thickness of about 0.16 inch in the green uncured condition, may result in a tie gum layer in the cured condition having a thickness of about 0.13 inch in the crown area, 0.15 inch in the shoulder area, 0.08 inch in the sidewall area, and 0.05 inch where the tie gum layer overlaps the bead filler.

Many advantages are provided by the all steel fabric radial construction described above. As compared to an agricultural or forestry tire designed for a similar loading utilizing conventional nylon plies and polyester belts, there is a reduced complexity, reduced weight, and the ability to contain a given pressure using many less belts and plies. This results in improved durability of the tire at higher temperatures. It also results in faster curing of the tires during manufacture, especially for larger size tires with very thick tread lugs.

The all steel fabric tire design set forth herein for the tire 14 is particularly suitable for use over a wide range of pressures, for example from 15 to 100 psi. The present design provides a significant weight reduction as compared to a tire utilizing conventional nylon plies and polyester belts. In one example the tire weight was reduced from 437 lbs. for a conventional agricultural tire construction to 362 lbs. utilizing the steel carcass ply and steel belts described above.

Another advantage of the present design is the use of the relatively thick tie gum layer which helps prevent moisture, oxygen and corrosive elements such as sulfur from migrating outward under pressure and reaching the steel reinforced carcass ply 44. This protects the steel in the carcass ply against corrosion, leading to a long service life. Agricultural tires are often expected to have a service life of many years. A tire for a self-propelled sprayer may have a typical service life of 3 to 5 years. A tractor tire may have a typical service life of 5 to 10 years.

Additional Description

Exemplary constructions for a pneumatic agricultural or forestry tire have been described. The following clauses are offered as further description of the disclosed invention.

(1) A pneumatic agricultural or forestry tire, comprising:
a circumferential tread portion including first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than about 40%;
a pair of bead portions, each bead portion including a bead core and a bead filler;
a pair of sidewall portions extending from the bead portions to the tread portion;
one and only one steel reinforced carcass ply extending circumferentially about the tire, the carcass ply including an axially inner portion and axially outer turn-up portions that extend around the bead portions and extend upwardly towards the tread portion and terminate at turn-up ends; and
two and only two circumferentially extending steel reinforced belts disposed between the carcass ply and the circumferential tread portion, each belt having a pair of axial ends, the two belts including a first belt being located radially inward of a second belt.

(2) The tire according to clause 1, further comprising:
a pair of sidewall inserts, each sidewall insert extending continuously from an upper end extending between the first belt and the carcass ply, through one of the sidewall portions of the tire, to a lower end extending between the axially inner portion of the carcass ply and one of the turn-up portions of the carcass ply.

(3) The tire according to clause 1 or clause 2, wherein:
the lower end of each sidewall insert overlaps an associated one of the bead fillers.

(4) The tire according to any preceding clause, wherein:
each sidewall insert is of one piece construction all of the same elastomeric compound.

(5) The tire according to any preceding clause, wherein:
the upper and lower ends of each sidewall insert are of a tapered thickness.

(6) The tire according to any preceding clause, wherein:
the turn-up portions each have a height extending above an associated one of the bead fillers.

(7) The tire according to any preceding clause, further comprising:
a pair of belt wedges extending circumferentially about the tire, each belt wedge extending between the axial ends of the first and second belts.

(8) The tire according to any preceding clause, wherein:
each belt wedge has a maximum thickness in the range of from about 0.2 inch to about 0.6 inch when the belt wedge is in a green uncured condition.

(9) The tire according to any preceding clause, wherein:
each belt wedge has a maximum thickness in the range of from about 0.3 inch to about 0.5 inch when the belt wedge is in a green uncured condition.

(10) The tire according to any preceding clause, further comprising:
a tie gum layer located radially and axially inward of the carcass ply and extending from one bead portion to the other bead portion, the tie gum layer having a thickness of from about 0.1 inch to about 0.25 inch, when the tie gum layer is in a green uncured condition; and
an inner liner located radially and axially inward of the tie gum layer.

(11) The tire according to any preceding clause, wherein:
the steel reinforced carcass ply is a radial-ply.

(12) The tire according to any preceding clause, wherein:
the tire is an agricultural tire and the tread portion has a tread type selected from the group consisting of R-1, R-1W and R-2 tread codes as defined by the Tire and Rim Association.

(13) The tire according to any preceding clause, wherein:
the tire has an outside diameter of at least about 55 inches.

(14) A pneumatic radial agricultural or forestry tire, comprising:
a tread portion, including first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than 40%;
a pair of opposing bead portions, each bead portion having a bead core and a bead filler;
a carcass reinforcing ply, the carcass reinforcing ply having radially oriented steel cords, the carcass reinforcing ply having an axially inner portion and two turn-up portions, one turn-up portion extending from each end of the axially inner portion and having a terminal end, the axially inner portion extending between the opposing bead portions and the turn-up portions being located axially outward of the bead portions;
a first radially inner belt and a second radially outer belt, each belt having steel cords, the belts being disposed between the carcass reinforcing ply and the tread portion;
a pair of sidewall inserts, each sidewall insert extending continuously from an upper end extending between the first belt and the carcass reinforcing ply, through a sidewall region of the tire, to a lower end extending between the axially inner portion of the carcass reinforcing ply and one of the turn-up portions of the carcass reinforcing ply, each lower end overlapping an associated one of the bead fillers;
a pair of belt wedges extending circumferentially about the tire, each belt wedge extending between axial edges of the first and second belts, and each belt wedge having a maximum thickness in a range of from 0.2 inch to 0.6 inch when the belt wedge is in a green uncured condition;
a tie gum layer radially and axially inward of the carcass reinforcing ply and extending from one bead portion to the other bead portion; and
an inner liner radially and axially inward of the tie gum layer.

(15) The tire of clause 14, wherein:
the carcass reinforcing ply comprises one and only one carcass reinforcing ply of the tire.

(16) The tire of clause 14 or clause 15, wherein:
the first and second belts comprise two and only two belts of the tire.

(17) The tire according to clause 14, 15 or 16, wherein:
the tire is an agricultural tire and the tread portion has a tread type selected from the group consisting of R-1, R-1W and R-2 tread codes as defined by the Tire and Rim Association.

(18) The tire according to clause 14, 15, 16 or 17, wherein:
the tire has an outside diameter of at least about 55 inches.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art which changes are encompassed within the scope and spirit of the present invention as defined by the appended claims.

What is claimed is:

1. A pneumatic agricultural or forestry tire, comprising:
a circumferential tread portion including first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than about 40%;
a pair of bead portions, each bead portion including a bead core and a bead filler;
a pair of sidewall portions extending from the bead portions to the tread portion;
one and only one steel reinforced carcass ply extending circumferentially about the tire, the carcass ply including an axially inner portion and axially outer turn-up portions that extend around the bead portions and extend upwardly towards the tread portion and terminate at turn-up ends;
two and only two circumferentially extending steel reinforced belts disposed between the carcass ply and the circumferential tread portion, each belt having a pair of axial ends, the two belts including a first belt being located radially inward of a second belt;
a pair of belt wedges extending circumferentially about the tire, each belt wedge extending between the axial ends of the first and second belts, each belt wedge having a maximum thickness in the range of from 0.2 inch to 0.6 inch when the belt wedge is in a green uncured condition; and
a pair of sidewall inserts, each sidewall insert extending continuously from an upper end extending between the first belt and the carcass ply, through one of the sidewall portions of the tire, to a lower end extending between the axially inner portion of the carcass ply and one of the turn-up portions of the carcass ply, wherein the upper and lower ends of each sidewall insert are of a tapered thickness and each of the sidewall inserts is of substantially uniform thickness except for the tapered upper and lower ends.

2. The tire of claim 1, wherein:
the lower end of each sidewall insert overlaps an associated one of the bead fillers.

3. The tire of claim 1, wherein:
each sidewall insert is of one piece construction all of the same elastomeric compound.

4. The tire of claim 1, wherein:
the turn-up portions each have a height extending above an associated one of the bead fillers.

5. The tire of claim 1, wherein:
each belt wedge has a maximum thickness in the range of from about 0.3 inch to about 0.5 inch when the belt wedge is in a green uncured condition.

6. The tire of claim 1, further comprising:
a tie gum layer located radially and axially inward of the carcass ply and extending from one bead portion to the other bead portion, the tie gum layer having a thickness of from about 0.1 inch to about 0.25 inch, when the tie gum layer is in a green uncured condition; and
an inner liner located radially and axially inward of the tie gum layer.

7. The tire of claim 1, wherein:
the steel reinforced carcass ply is a radial-ply.

8. The tire of claim 1, wherein:
the tire is an agricultural tire and the tread portion has a tread type selected from the group consisting of R-1, R-1W and R-2 tread codes as defined by the Tire and Rim Association.

9. The tire of claim 8, wherein:
the tire has an outside diameter of at least about 55 inches.

10. The tire of claim 1, wherein:
the tire has an outside diameter of at least about 55 inches.

11. The tire of claim 1, wherein:
each of the sidewall inserts is of uniform thickness except for the tapered upper and lower ends.

12. A pneumatic radial agricultural or forestry tire, comprising:
a tread portion, including first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than 40%;
a pair of opposing bead portions, each bead portion having a bead core and a bead filler;
a carcass reinforcing ply, the carcass reinforcing ply having radially oriented steel cords, the carcass reinforcing ply having an axially inner portion and two turn-up portions, one turn-up portion extending from each end of the axially inner portion and having a terminal end, the axially inner portion extending between the opposing bead portions and the turn-up portions being located axially outward of the bead portions;
a first radially inner belt and a second radially outer belt, each belt having steel cords, the belts being disposed between the carcass reinforcing ply and the tread portion;
a pair of sidewall inserts, each sidewall insert extending continuously from an upper end extending between the first belt and the carcass reinforcing ply, through a sidewall region of the tire, to a lower end extending between the axially inner portion of the carcass reinforcing ply and one of the turn-up portions of the carcass reinforcing ply, each lower end overlapping an associated one of the bead fillers on an axially outer side of the bead filler, wherein each of the sidewall inserts is of substantially uniform thickness throughout a majority of a height of the sidewall region;
a pair of belt wedges extending circumferentially about the tire, each belt wedge extending between axial edges of the first and second belts, and each belt wedge having a maximum thickness in a range of from 0.2 inch to 0.6 inch when the belt wedge is in a green uncured condition;
a tie gum layer radially and axially inward of the carcass reinforcing ply and extending from one bead portion to the other bead portion; and
an inner liner radially and axially inward of the tie gum layer.

13. The tire of claim 12, wherein:
the carcass reinforcing ply comprises one and only one carcass reinforcing ply of the tire.

14. The tire of claim 12, wherein:
the first and second belts comprise two and only two belts of the tire.

15. The tire of claim 12, wherein:
the tire is an agricultural tire and the tread portion has a tread type selected from the group consisting of R-1, R-1W and R-2 tread codes as defined by the Tire and Rim Association.

16. The tire of claim 15, wherein:
the tire has an outside diameter of at least about 55 inches.

17. The tire of claim 12, wherein:
the tire has an outside diameter of at least about 55 inches.

18. The tire of claim 12, wherein:
each of the sidewall inserts is of uniform thickness throughout a majority of the height of the sidewall region.

19. A pneumatic radial agricultural or forestry tire, comprising:
a tread portion, including first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than 40%;
a pair of opposing bead portions, each bead portion having a bead core and a bead filler;
a carcass reinforcing ply, the carcass reinforcing ply having radially oriented steel cords, the carcass reinforcing ply having an axially inner portion and two turn-up portions, one turn-up portion extending from each end of the axially inner portion and having a terminal end, the axially inner portion extending between the opposing bead portions and the turn-up portions being located axially outward of the bead portions;
a first radially inner belt and a second radially outer belt, each belt having steel cords, the belts being disposed between the carcass reinforcing ply and the tread portion;
a pair of sidewall inserts, each sidewall insert extending continuously from an upper end extending between the first belt and the carcass reinforcing ply, through a sidewall region of the tire, to a lower end extending between the axially inner portion of the carcass reinforcing ply and one of the turn-up portions of the carcass reinforcing ply, each lower end overlapping an associated one of the bead fillers on an axially outer side of the bead filler;
a pair of belt wedges extending circumferentially about the tire, each belt wedge extending between axial edges of the first and second belts, and each belt wedge having a maximum thickness in a range of from 0.2 inch to 0.6 inch when the belt wedge is in a green uncured condition;
a tie gum layer radially and axially inward of the carcass reinforcing ply and extending from one bead portion to the other bead portion; and
an inner liner radially and axially inward of the tie gum layer;
wherein each of the sidewall inserts is not tapered throughout a majority of a height of the sidewall region.

20. A pneumatic agricultural or forestry tire, comprising:
a circumferential tread portion including first and second rows of tread lugs extending from first and second shoulders of the tread portion toward an equatorial plane of the tire, the lugs extending at an angle of from 0° to 65° to a rotational axis of the tire, the tread portion having a ratio of contact area to total tread area of no greater than about 40%;
a pair of bead portions, each bead portion including a bead core and a bead filler;
a pair of sidewall portions extending from the bead portions to the tread portion;
one and only one steel reinforced carcass ply extending circumferentially about the tire, the carcass ply including an axially inner portion and axially outer turn-up portions that extend around the bead portions and extend upwardly towards the tread portion and terminate at turn-up ends;
two and only two circumferentially extending steel reinforced belts disposed between the carcass ply and the circumferential tread portion, each belt having a pair of axial ends, the two belts including a first belt being located radially inward of a second belt;
a pair of belt wedges extending circumferentially about the tire, each belt wedge extending between the axial ends of the first and second belts, each belt wedge having a maximum thickness in the range of from 0.2 inch to 0.6 inch when the belt wedge is in a green uncured condition; and
a pair of sidewall inserts, each sidewall insert extending continuously from an upper end extending between the first belt and the carcass ply, through one of the sidewall portions of the tire, to a lower end extending between the axially inner portion of the carcass ply and one of the turn-up portions of the carcass ply, wherein the upper and lower ends of each sidewall insert are of a tapered thickness, wherein each of the sidewall inserts is not tapered except for the tapered upper and lower ends.

* * * * *